United States Patent [19]

Yamauchi et al.

[11] Patent Number: 4,718,242
[45] Date of Patent: Jan. 12, 1988

[54] CHEMICAL HEAT PUMP UTILIZING CLATHRATE FORMATION REACTION

[75] Inventors: Takao Yamauchi, Yokohama; Kyoya Nishimoto, Chiba; Nozomu Tanemori, Funabashi, all of Japan

[73] Assignee: Shinryo Corporation, Tokyo, Japan

[21] Appl. No.: 948,225

[22] Filed: Dec. 31, 1986

[30] Foreign Application Priority Data

Jan. 9, 1986 [JP] Japan .................. 61-002460
Apr. 28, 1986 [JP] Japan .................. 61-098660
May 30, 1986 [JP] Japan .................. 61-125373

[51] Int. Cl.⁴ .................................... F25B 93/00
[52] U.S. Cl. .................................... 62/467; 165/104.12
[58] Field of Search ................ 62/48, 467; 165/104.12

[56] References Cited

U.S. PATENT DOCUMENTS

| | | | |
|---|---|---|---|
| 3,633,373 | 1/1972 | Carbonell | 62/467 |
| 3,854,301 | 12/1974 | Cytryn | 62/467 |
| 4,111,002 | 9/1978 | Van Mal et al. | 62/467 |
| 4,409,799 | 10/1983 | Nishizaki et al. | 62/467 |
| 4,485,629 | 12/1984 | Le Goff | 165/104.12 |
| 4,523,635 | 6/1985 | Nishizaki et al. | 165/104.12 |

Primary Examiner—Ronald C. Capossela
Attorney, Agent, or Firm—Burns, Doane, Swecker & Mathis

[57] ABSTRACT

A chemical heat pump utilizing a hydrating agent as the working fluid is disclosed. The clathrate formation reaction of a hydrating agent such as flon 31 or 22 is used as one of the two equilibrium reactions of the working fluid so that heat can be pumped up across a temperature difference greater than that between the two heat sources. The heat pump comprises four container means in which reactions take place so that the regeneration process can be effected simultaneously with the heating or refrigerating process in which the temperature of the thermal medium to be utilized, e.g., water, is raised or lowered. The working fluid flows either in continuous one-directional circulation through the four container means, or in alternate directions therebetween. In addition to the two heat sources at two different temperatures, such as waste heat and open air, the heat pump further comprises gas pipes which allow the free movement of the working fluid between the connected container means.

22 Claims, 13 Drawing Figures

CHEMICAL HEAT PUMP UTILIZING CLATHRATE FORMATION REACTION

BACKGROUND OF THE INVENTION

1. Field of the Invention

The present invention relates to chemical heat pumps utilizing the phenomenon of absorption and release of the heat of reaction of a working fluid substance, in order to raise or lower the temperature of a thermal medium so as to effect air conditioning, refrigeration, and the like. The heat of reaction includes the latent heat of phase transition and heat of absorption or evolvement, as well as the heat of usual chemical reactions.

2. Description of the Prior Art

Industrial waste heat consists largely of low temperature waste heat at a temperature of roughly 30 to 50 degrees centigrade. Further, underground water represents a vast heat source with a temperature of about 15 to 20 degrees centigrade. Thus, if it is possible to raise or lower the temperature of a thermal medium to a practical level using only these low quality heat sources, the resulting advantage is very great.

One type of heat pump apparatus which has been proposed for utilizing such heat sources is the steam compression-type heat pump. This type of heat pump draws up heat by shifting the equilibrium of the working fluid between the gas and the liquid phase by means of a compressor which is driven, for example, by an electric motor. The steam compression-type heat pump is capable of obtaining high quality heat in a temperature range of about 50 to 60 degrees centigrade by raising the temperature of low quality heat having a temperature of about 15 to 20 degrees centigrade.

However, the coefficient of performance of these steam compression-type heat pumps is rather low, being only about 3 in the above-described case.

Thus, there is much need for chemical heat pumps which utilize only the temperature difference between high and low temperature heat sources (e.g., between waste heat or underground water and open air) and do not need to be supplied with mechanical work in order to operate.

Figure 1:
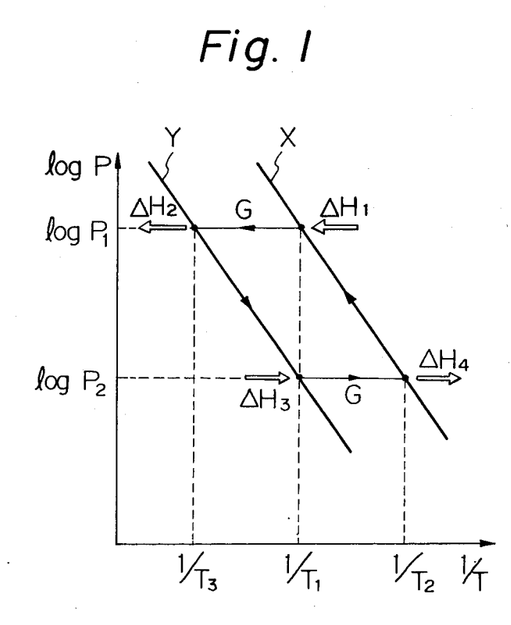
FIG. 1 is a diagram showing the process cycle of a conventional chemical heat pump, in which the lines represent the relationships between the reciprocal of the absolute temperature and the logarithm of the equilibrium pressure of equilibrium reactions involving the working fluid.
Figure 2:
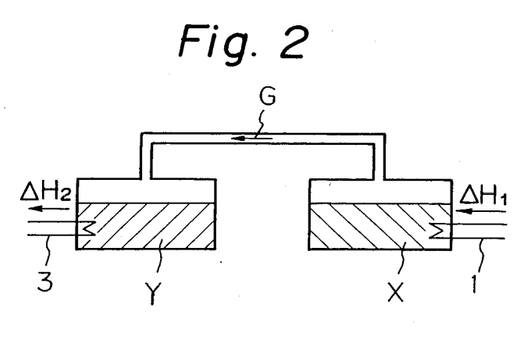
FIGS. 2 and 3 are schematic views of a conventional chemical heat pump utilizing the process cycle shown in FIG. 1.
Figure 3:
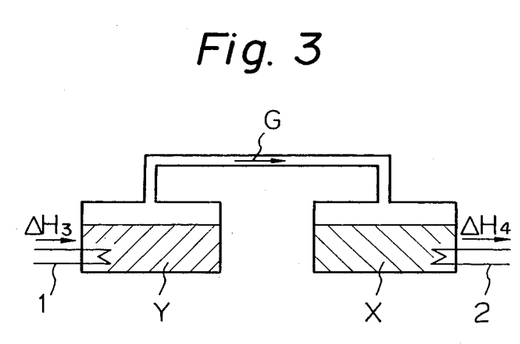

Referring now to FIGS. 1 through 3, the principles of operation of conventional chemical heat pumps will be explained.

FIG. 1 is a graph illustrating the relationships between the reciprocal (1/T) of the absolute temperature T and the logarithm (log P) of the equilibrium pressure P for absorption and evolvement reactions in which a working fluid (such as ammonia or water) is absorbed into and evolved from two distinct absorbents X and Y. Line X represents the relationship between the reciprocal (1/T) of the absolute temperature T and the logarithm (log P) of the equilibrium pressure P of the working fluid (in pure chemical composition) when there is equilibrium between the liquid and the gas phases. As shown in the figure, the logarithm (log P) of the equilibrium pressure P varies substantially linearly with respect to the reciprocal (1/T) of the absolute temperature T. The equilibrium pressure at a given temperature, however, takes different values according to the kinds and concentrations of the absorbents used.

FIGS. 2 and 3 are schematic views of a heat pump for raising the temperature of a thermal medium utilizing absorbents X and Y which have differing equilibrium pressures. Absorbent X may be replaced with the liquid phase of the working fluid. Thus, the following description, which is made with respect to the case of two distinct absorbents, also applies to the case where phase equilibrium between the gas and the liquid phases of the working fluid is utilized instead of absorption-evolvement equilibrium of the working fluid into and from absorbent X.

The pair of reaction vessels containing the absorbents X and Y are connected by means of a gas pipe so that the gaseous working fluid G is capable of being transported between the two vessels. The absorbents X and Y have the equilibrium pressure-temperature characteristics shown in FIG. 1 by lines X and Y, respectively. FIGS. 2 and 3 show the temperature raising process and the regeneration process, respectively. Utilizing the first heat source 1, such as industrial waste heat at a temperature T1, and the second heat source 2, such as open air at a temperature T2 which is lower than T1, the heat pump raises the temperature of the thermal medium 3 to a target level T3 which is higher than the temperature T1 of the first heat source 1.

In the temperature raising process shown in FIG. 2, the absorbents X and Y are placed in thermal contact with the first heat source 1 and the medium 3, respectively. Thus, the gaseous working fluid G evolving from absorbent X having a high equilibrium pressure moves in the gas pipe in the direction shown by the arrow in FIG. 2, and is absorbed by absorbent Y. As shown in FIG. 1, this process proceeds at equilibrium pressures substantially equal to P1, the driving force acting on the gaseous working fluid G being derived from the slightly higher equilibrium pressure of absorbent X with respect to that of absorbent Y. In the process, the working fluid G absorbs the heat of gas evolvement $\Delta H1$ from the first heat source 1 and supplies the heat of gas absorption $\Delta H2$ to the medium 3, so that the temperature of the medium 3 is raised to the target temperature T3 which is higher than the temperature T1 of the first heat source 1.

On the other hand, in the regeneration process shown in FIG. 3, absorbent Y is in thermal contact with the first heat source 1, while absorbent X is in thermal contact with the second heat source 2 which is the coolant heat source. Thus, the temperatures of the absorbents X and Y are made substantially equal to the temperatures T2 and T1 of the second and the first heat sources 2 and 1, respectively. During this regeneration process, the equilibrium pressure of the working fluid G is substantially equal to the pressure P2 of both absorbents X and Y as shown in FIG. 1. The equilibrium pressure of absorbent Y, however, is slightly higher than that of absorbent X, and this pressure difference drives the working fluid G evolved from absorbent Y in the direction shown by the arrow in FIG. 3 in the gas pipe so that it is absorbed by absorbent X. In the process, absorbent Y gives up the heat of evolvement $\Delta H3$ to the working fluid G, and the working fluid G releases the heat of absorption $\Delta H4$ to absorbent X.

Thus, in principle, chemical heat pumps are capable of raising the temperature of a thermal medium utilizing only the temperature difference between the two heat sources without any need of mechanical work. Because chemical heat pumps need scarcely any external mechanical power, they are potentially capable of greatly reducing energy consumption if they can be applied to air-conditioning of dwellings, greenhouse heating, and the like.

Although the above description has been limited to the case of a temperature-raising apparatus, chemical heat pumps can also be used to lower the temperature of a thermal medium, i.e., for cooling or refrigerating purposes, in which the directions of the arrows in FIGS. 1 through 3 are reversed.

However, conventional chemical heat pumps have a grave disadvantage that they are not capable of obtaining high quality heat when a low quality heat source with a temperature of about 20 to 50 degrees centigrade is used. For example, when waste hot water at 30 degrees centigrade is used as the first heat source 1 and the open air at 10 degrees centigrade is used as the second heat source 2, the thermal medium 3, such as hot water reaches a temperature of only about 40 degrees centigrade, making the hot water of little value. Even if waste steam at 40 degrees centigrade is used as the higher temperature heat source 1, the hot water obtained reaches only 55 degrees centigrade. Thus, the change in temperature which conventional heat pumps can produce when using low quality heat sources is extremely small, which severely limits their utility.

The reason why the change in temperature which conventional heat pumps can produce is small is as follows. (Although the case where a heat pump is used to raise the temperature of a thermal medium is explained, the explanation also applies to the case where the temperature of the medium is lowered.)

The temperature rise $\Delta T$ of the thermal medium which is produced by the heat pump of FIGS. 2 and 3 is equal to $T3-T1$. It is now assumed that lines X and Y representing the relationships between the reciprocal $(1/T)$ of the absolute temperature T and the logarithm $(\log P)$ of the equilibrium pressure P of the working fluid G when it is in equilibrium with absorbents X and Y, respectively, are parallel to each other, as shown in FIG. 1. This assumption is substantially justified in the case of conventional chemical heat pumps as explained later. Under this assumption, the following equation holds:

$$(1/T3)-(1/T1)=(1/T1)-(1/T2).$$

Thus, $$\Delta T=T3-T1=(T3/T2)(T1-T2)\simeq T1-T2.$$

Thus, the rise in temperature $\Delta T$ is substantially limited by the difference in temperature $T1-T2$ between the first and the second heat sources 1 and 2 cannot exceed it. The loss of heat in actual heat pumps further reduces the temperature rise $\Delta T$ which the pump can produce in the thermal medium.

In the above explanation, the lines representing the relationships between the reciprocal $(1/T)$ of the absolute temperature T and the logarithm $(\log P)$ of the equilibrium pressure P of the working fluid when there is equilibrium with two kinds of absorbents X and Y were assumed to be parallel to each other. Justification of this assumption is as follows.

The slope of the line representing the relationship between the reciprocal $(1/T)$ of the absolute temperature T and the logarithm $(\log P)$ of the equilibrium pressure P at an equilibrium in chemical reactions, including gas absorption and evolvement by absorbents or phase transition between liquid and gas phases, is solely dependent upon the heat of reaction per mole $\Delta H/\text{mol}$, or more specifically is equal to $(\Delta H/\text{mol})/R$ wherein R is the gas constant.

The magnitudes of the heat of reaction per mole of working fluids such as ammonia which are used in conventional chemical heat pumps, however, are substantially the same for different kinds of absorbents, and for the gas absorption reaction and the phase transition reaction. The magnitudes of the heat of reaction are particularly close to each other in the case of the pair of absorbents used in conventional heat pumps, because the temperatures at which a practical pair of absorbents attain equilibrium under 1 atmosphere should be close to each other. Thus, in the case of a practical pair of absorbents, the lines representing the relationship between the reciprocal $(1/T)$ of the absolute temperature T and the logarithm $(\log P)$ of the equilibrium pressure P are substantially parallel to each other.

Therefore, the change in temperature which conventional chemical heat pumps are capable of producing is severely limited even in principle. If the heat loss in actual pumps is taken into consideration, chemical heat pumps utilizing low quality heat sources are unpractical.

SUMMARY OF THE INVENTION

Thus, the object of the present invention is to provide a chemical heat pump which is free from the above-described disadvantages of conventional chemical heat pumps.

More particularly, the present invention aims at providing a chemical heat pump which is capable of raising or lowering the temperature of a thermal medium by a sufficient amount to make the medium utilizable while employing low quality heat sources.

As a result of extensive research aimed at attaining the above-described object of the present invention, the inventors of the present invention conceived of using hydrating agents such as flons or fluorocarbons (organic compounds in which all or a portion of the hydrogen atoms of a hydrocarbon, such as methane and ethane, have been replaced by fluorine atoms or by fluorine and other additional halogen atoms) as the working fluid so that the clathrate formation reaction of the hydrating agent (i.e., the inclusion or the hydration reaction) is utilized as one of the two equilibrium reactions in the chemical heat pump.

The heat of clathrate formation reaction per mole of hydrating agents such as flons is far greater than the heat of gas absorption or the latent heat of liquefaction (i.e., the latent heat of vaporization) thereof. Thus, the slopes of the lines representing the relationships between the reciprocal $(1/T)$ of the absolute temperature T and the logarithm $(\log P)$ of the equilibrium pressure P of such hydrating agents are markedly different for the clathrate formation reaction (hydration reaction) and for the gas absorption reaction into an absorbent (or liquefaction).

The next table shows the latent heat of liquefaction $\Delta Hx$ (i.e., the latent heat of vaporization) and the heat of hydration $\Delta Hz$ of various hydrating agents (both being measured by the unit of kcal/mol-hydrating-agent), together with the ratios $\Delta Hz/\Delta Hx$ thereof.

| hydrating agent | $\Delta Hx$ | $\Delta Hz$ | $\Delta Hz/\Delta Hx$ |
| --- | --- | --- | --- |
| flon 11 | 5.9 | 35.4 | 6.0 |
| flon 12 | 4.8 | 30.1 | 6.3 |
| flon 21 | 6.0 | 32.9 | 5.5 |

-continued

| hydrating agent | ΔHx | ΔHz | ΔHz/ΔHx |
|---|---|---|---|
| flon 22 | 4.8 | 20.4 | 4.3 |
| flon 31 | 5.0 | 21.1 | 4.2 |
| flon 40 | 5.1 | 18.1 | 3.5 |
| flon 41 | 4.2 | 15.5 | 3.7 |

Figure 4:
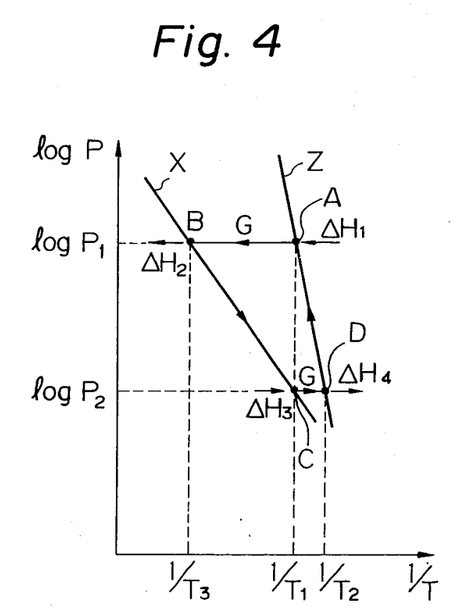
FIG. 4 is a diagram similar to FIG. 1, but showing the process cycle according to a first aspect of the present invention, which is utilized for raising the temperature of a thermal medium.
Figure 5:
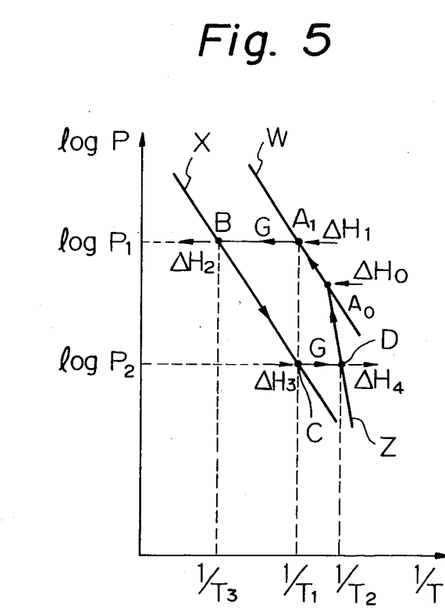
FIG. 5 is a diagram similar to FIG. 4, but showing the process cycle according to a second aspect of the present invention.
Figure 6:
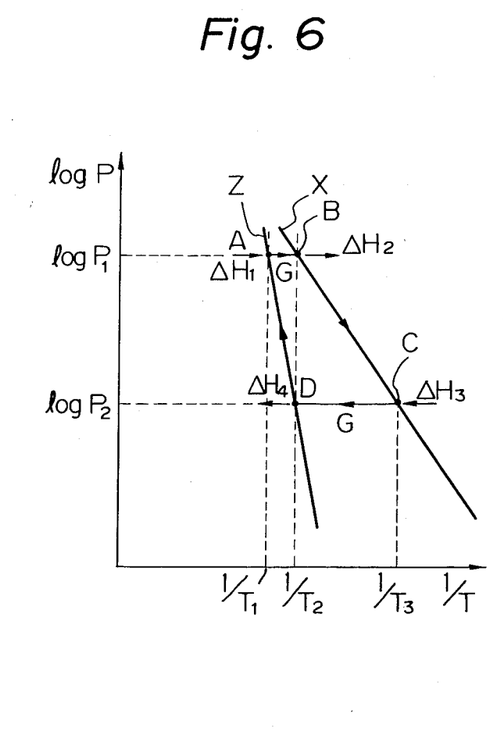
FIG. 6 is another diagram similar to FIG. 4, but showing the process cycle according to a third aspect of the present invention which is for lowering the temperature of a thermal medium.

As shown in the table, the heats of hydration ΔHz of hydrating agents are far greater than the latent heat ΔHx or the heat of gas absorption (which is substantially equal to the latent heat ΔHx) due to the fact that the hydrations thereof are reactions of clathrate formation. Thus, the slope of line Z representing the relationship between the reciprocal (1/T) of the absolute temperature T and the logarithm (log P) of the equilibrium pressure P in the hydration reaction of the hydrating agents is far greater than that of line X representing the case of a gas absorption reaction or the liquefaction thereof, as shown in FIGS. 4 through 6. More specifically, the ratio of the slopes of lines Z and X is given by ΔHz/ΔHx.

FIG. 4 shows lines X and Z representing the cases of the gas absorption and the clathrate formation reactions of a hydrating agent, respectively, which are to be utilized in a chemical heat pump according to the present invention for raising the temperature of a thermal medium. In the figure, T1 and T2 represent the temperatures of the first and the second heat sources, respectively, T3 being the target temperature of the thermal medium. (The second heat source is the coolant heat source.) The processes at points A and C on lines Z and X are effected in a state of thermal contact with the first heat source, while process D is effected in a state of thermal contact with the second heat source. As a result of this, the rise in temperature T3−T1 can be far greater than the temperature difference T1−T2 of the two heat sources.

A clathrate formation reaction of hydrating agents produces a rise in temperature of the thermal medium which is far greater than the temperature difference between the two heat sources used. There are certain cases, however, in which the process of FIG. 4 is replaced with advantage with that of FIG. 5, depending on the particular heat sources or on the compound used as the hydrating agent in the chemical heat pump. Namely, the process cycle of FIG. 5 should be applied in the cases in which the gas hydrate formed in the clathrate formation reaction at point D first decomposes into water and a liquid phase hydrating agent, instead of decomposing directly into water and a gas phase hydrating agent.

Thus, FIG. 5 shows a second cycle which is to be used in the chemical heat pump according to the present invention for raising the temperature of a thermal medium. In the figure, lines X and Z represent the equilibrium pressures of the gas absorption and the clathrate formation reactions, respectively, as in FIG. 4. Line W, on the other hand, represents the equilibrium pressures of the liquefaction reaction of the hydrating agent, which crosses line Z at point A0.

The process cycle of FIG. 5 proceeds as follows. The gas hydrate formed in process D at temperature T2 as a result of thermal contact with the second heat source first decomposes into water and a liquid phase hydrating agent at A0 after being heated and under increasing pressure in thermal contact with the first heat source at temperature T1. In this decomposition process, the heat of decomposition ΔH0 is absorbed from the first heat source. When the temperature of the liquid phase hydrating agent is further raised to T1, the liquid phase hydrating agent is vaporized at A1, the latent heat of vaporization ΔH1 being also absorbed from the first heat source. The processes at points B, C, and D are the same as the corresponding processes in FIG. 4.

A clathrate formation reaction can also be used in chemical heat pumps according to the present invention for lowering the temperature of the thermal medium. FIG. 6 shows lines X and Z representing the gas absorption reaction (or liquefaction reaction) and the clathrate formation reaction, respectively, which are to be utilized in a chemical heat pump for lowering the temperature of the medium. In the figure, T1 and T2 respectively represent the temperatures of the first and the second heat sources, T3 being the target temperature. The process at point A is effected in thermal contact with the first heat source, while those at B and D are effected in thermal contact with the second heat source. As a result, the decrease in temperature T2−T3 of a thermal medium can be made far greater than the temperature difference T1−T2 between the two heat sources used.

According to a first aspect of the present invention, the process cycle of FIG. 4 is used. Thus, a chemical heat pump according to the first aspect of the present invention comprises first and second heat sources. The first heat source may be industrial waste heat or underground water at a temperature higher than that of the second heat source, which may be open air. A hydrating agent such a flon or a fluorocarbon gas which forms a gas hydrate by a clathrate formation reaction is used as the working fluid of the heat pump. The pump comprises four container means, the first two being connected with one another and the last two being connected with one another by gas conveying means such as a gas pipe.

The first container means contains and places the gas hydrate in thermal contact with the first heat source, so that the gas hydrate is decomposed into water and a gas phase hydrating agent. The hydrating agent absorbs a portion of the heat of reaction of the gas hydrate decomposition in the process. This process in the first container corresponds to point A in FIG. 4.

The second container means is connected with the first container means through the first gas conveying means, so that the pressure therein is substantially the same as that in the first container means. The hydrating agent coming through the first gas conveying means takes part in an equilibrium reaction which may be an equilibrium reaction of gas absorption into an absorbent. The second container thus contains an absorbent, which is placed in thermal contact with the thermal medium. The hydrating agent releases the heat of reaction of the equilibrium reaction, i.e., the heat of gas absorption, which is received by the thermal medium. Due to the fact that the equilibrium reaction proceeds at a pressure which is substantially equal to that in the first container means, the thermal medium is raised to a temperature higher than that of the first heat source. The process in the second container means corresponds to point B in FIG. 4.

The third and fourth container means effect the regeneration process. Thus, the third and fourth container means are connected by second gas conveying means such as a gas pipe, and are put into thermal contact with the first and the second heat sources, respectively. The third container means contains the material formed in the equilibrium reaction, i.e., the absorbent which has absorbed the hydrating agent. The hydrating agent evolving from the material in the third container means moves through the second gas conveying means into the fourth container means, in which the hydrating agent reacts with water to form the gas hydrate. The processes in the third and fourth container means proceed at a pressure lower than that in the first and second container means, and correspond to points C and D in FIG. 4.

According to a second aspect of the present invention, the process cycle of FIG. 5 is used. Thus, the heat pump according to the second aspect of the present invention is also for raising the temperature of a thermal medium and has substantially the same construction as the heat pump according to the first aspect of the present invention.

The gas hydrate formed in the fourth container means in the process corresponding to point D in FIG. 5, however, is first decomposed into water and a liquid phase hydrating agent in the first container means in a process corresponding to point A0 in the figure. The liquid phase hydrating agent is then evaporated by further heat from the first heat source.

Thus, in a heat pump system in which the working fluid flows in one direction circulating through the four container means, the first container means should comprise two separate vessels in which the process of decomposition into water and a liquid phase hydrating agent and the proces of vaporization of the liquid phase hydrating agent alternately take place. For this reason, a heat pump system of the "batch process type" in which the working fluid flows in alternate directions is more preferred according to this aspect of the present invention.

The second container means contains an absorbent and the third means contains the absorbent which has absorbed the hydrating agent.

Otherwise, the heat pump according to the second aspect of the present invention is similar to that according to the first aspect.

According to a third aspect of the present invention, the process cycle of FIG. 6 is used. Thus, the heat pump according to the third aspect of the present invention is for lowering the temperature of a thermal medium (e.g., for the purpose of refrigeration). The heat pump according to this aspect also comprises two heat sources together with four container means, the first two and the last two of which are connected by gas conveying means.

The process taking place in the first and the second container means corresponding to points A and B in FIG. 6, however, is a regeneration process. The second container means is in thermal contact with the second heat source which is at lower temperature than the first heat source.

The process taking place at a lower pressure in the third and the fourth container means corresponding to points C and D in the figure involves the transfer of heat from the thermal medium which is in contact with the third container means. The thermal medium is thus cooled or refrigerated to a temperature far below that of the second or coolant heat source.

According to all three aspects of the present invention, the hydrating agent is used as the working fluid and a clathrate formation reaction having a very great heat of reaction is utilized in one of the two equilibrium reactions of the chemical heat pump. Thus, the rise or the decrease in temperature $\Delta T$ (T3−T1 or T2−T3) of the thermal medium can be made far greater than the temperature difference T1−T2 between the first and the second heat sources.

Therefore, according to the present invention, a chemical heat pump which can effect heating or refrigeration with high efficiency utilizing only low quality waste heat is realized. The resulting economic or practical advantage is very great. Further, if the heat pump according to the present invention is applied to agricultural heating purposes utilizing underground water as the heat source, an agricultural heating system of extremely high efficiency can be realized.

BRIEF DESCRIPTION OF THE DRAWINGS

Further details of the invention will become more apparent from the following detailed description of the preferred embodiments taken in conjunction with the accompanying drawings, in which.

In the drawings, like reference numerals and characters refer to like or similar elements.

DESCRIPTION OF THE PREFERRED EMBODIMENTS

According to the present invention, a hydrating agent is used as the working fluid. A hydrating agent is a compound which forms a gas hydrate by a clathrate formation reaction when placed in contact with water. The hydrating agent according to the present invention may be any one or a mixture of the compounds such as flons and carbon dioxide which are known to form gas hydrates by a clathrate formation reaction. Flons or fluorocarbons are preferred as the hydrating agent according to the present invention. The term flon is herein used to denote a compound in which all or a portion of the hydrogen atoms of a hydrocarbon (methane or ethane, in particular) are replaced by fluorine atoms or by fluorine and other halogen atoms. Examples of flons are as follows:

| | |
|---|---|
| flon 11 | $CCl_3F$ |
| flon 12 | $CCl_2F_2$ |
| flon 13 | $CClF_3$ |
| flon 13B | $CBrF_3$ |
| flon 14 | $CF_4$ |
| flon 21 | $CHCl_2F$ |
| flon 22 | $CHClF_2$ |
| flon 23 | $CHF_3$ |
| flon 31 | $CH_2ClF$ |
| flon 32 | $CH_2F_2$ |
| flon 41 | $CH_3F$ |
| flon 113 | $CCl_2F—CClF_2$ |
| flon 114 | $CClF_2—CClF_2$ |
| flon 115 | $CClF_2—CF_3$ |
| flon 116 | $CF_3—CF_3$ |
| flon 142b | $CH_3—CClF_2$ |
| flon 152a | $CH_3—CHF_2$ |

In the examples given above, flons 31 and 22 are particularly preferred because of the operating temperatures and pressures, etc., thereof.

The absorbent used in the present invention may be any liquid compound which absorbs and evolves a hydrating agent such as those listed above. The preferred absorbents according to the present invention include N, N-dimethylformamide, dibutyl phthalate, isobutyl acetate, tetraethylene glycol dimethyl ether, and diethylene glycol dimethyl ether.

FIRST EMBODIMENT

Figure 7:
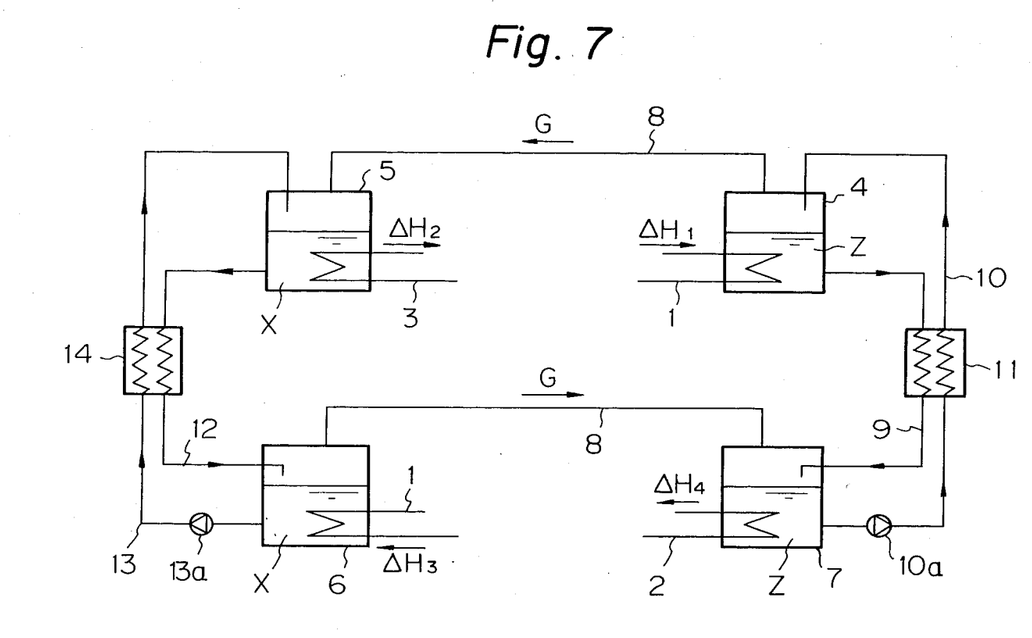
FIG. 7 is a block diagram of a first embodiment of the present invention of the circulatory continuous flow type utilizing the process cycle of FIG. 4.

Referring now to FIGS. 4 and 7 of the drawings, a first embodiment of the present invention which utilizes the process cycle of FIG. 4 will be described. This embodiment is for raising the temperature of a thermal medium. In other words, it is used for heating purposes, and the working fluid is circulated in one direction through the four reaction vessels.

A first and a fourth reaction vessel 4 and 7, respectively, contain water and a gas hydrate Z of a hydrating agent G. Flon 31 is used as the hydrating agent. A second and a third reaction vessel 5 and 6, respectively, contain an absorbent X in which the hydrating agent G is partially absorbed. Tetraethylene glycol dimethyl ether is used as the absorbent X.

The first and the third vessels 4 and 6 are in thermal contact with a first heat source 1 at temperature T1; the first heat source 1 may be waste heat at 30 degrees centigrade. The second vessel 5, on the other hand, is in thermal contact with a thermal medium 3, while the fourth vessel 7 is in thermal contact with a second heat source 2 at temperature T2; the second heat source 2 may be open air at 0 degrees centigrade. The thermal medium 3 in this embodiment is water, which is heated to the target temperature T3 in the second vessel 5.

The first and the second vessels 4 and 5, as well as the third and fourth vessels 6 and 7, are connected by gas pipes 8, which keep the connected pairs of vessels substantially at the same pressures P1 and P2, respectively, and allow the hydrating agent G to flow from the first vessel 4 to the second vessel 5 and from the third vessel 6 to the fourth vessel 7 due to pressure differences therebetween.

The equilibrium reaction process of the gas hydrate decomposition in the first vessel 4 corresponds to point A in FIG. 4, the first vessel 4 being in thermal contact with the first heat source 1. Thus, the pressure in the second vessel 5 is substantially equal to the pressure P1 in the first vessel 4, so that the equilibrium of the gas absorption reaction of the hydrating agent G with the absorbent X in the second vessel 5 corresponds to point B on line X. The equilibrium reaction in the first vessel 4 proceeds in the direction of the decomposition of the gas hydrate Z, while that in the second vessel 5 proceeds in the direction of gas absorption of the hydrating agent G into the absorbent X, the equilibrium pressure in the first vessel 4 being slightly higher than that in the second vessel 5. Thus, the hydrating agent G is driven by the pressure difference in the gas pipe in the direction of the arrow in FIG. 7, and the equilibrium reactions in the two vessels 4 and 5 proceed still further. In the process, the heat of reaction $\Delta H1$ of the decomposition of the gas hydrate Z supplied by the first heat source 1 is partly absorbed by the hydrating agent G which in its turn supplies the heat of reaction of the gas absorption $\Delta H2$ to the thermal medium 3. Thus, the medium 3 is heated to the target temperature T3.

The absorbent X in the third vessel 6, on the other hand, is in thermal contact with the first heat source 1 and is kept substantially at temperature T1, while the water and the gas hydrate Z in the fourth vessel 7 are in thermal contact with the second heat source 2 and are kept substantially at temperature T2. Both vessels are at substantially the same lower pressure P2. Thus, the absorbent X and the gas hydrate Z in these vessels 6 and 7 are in the states of equilibrium corresponding to points C and D in FIG. 4 respectively. The equilibrium pressure in the third vessel 6, however, is slightly higher than that in the fourth vessel 7, so that the hydrating agent G is continually evolved from the absorbent X in the third vessel 6 and moves through the gas pipe 8 to react with water to form the gas hydrate Z by a clathrate formation reaction in the fourth vessel 7. In this regeneration process, the heat of reaction of the gas absorption $\Delta H3$ is supplied from the first heat source 1 and the heat of reaction of the gas hydrate formation $\Delta H4$ is absorbed by the second heat source 2.

The water decomposed from the gas hydrate Z in the first vessel 4 is returned to the fourth vessel 7 through the water pipe 9, which constitutes a water conveying means. The gas hydrate Z formed by the clathrate formation reaction in the fourth vessel 7, on the other hand, is pumped against the pressure difference by a mechanical pump 10a in the form of a slurry, through the gas hydrate pipe 10, which constitutes a gas hydrate conveying means, to the first vessel 4. In a heat exchanger 11, heat exchange between the two pipes 9 and 10 takes place to enhance the efficiency of this embodiment.

The absorbent X which has absorbed the hydrating agent G in the second vessel 5 is sent to the third vessel 6 through an absorbent conducting pipe 12, which constitutes an absorbent conveying means. The absorbent which has evolved the hydrating agent in the third vessel 6, on the other hand, is pumped against the pressure difference between the two vessels 5 and 6 by a mechanical pump 13a through another absorbent conducting pipe 13, which constitutes a second absorbent conveying means. The two pipes 12 and 13 are placed in thermal contact in a heat exchanger 14, and heat exchange takes place therebetween to further enhance the heat efficiency of this embodiment.

Figure 8:
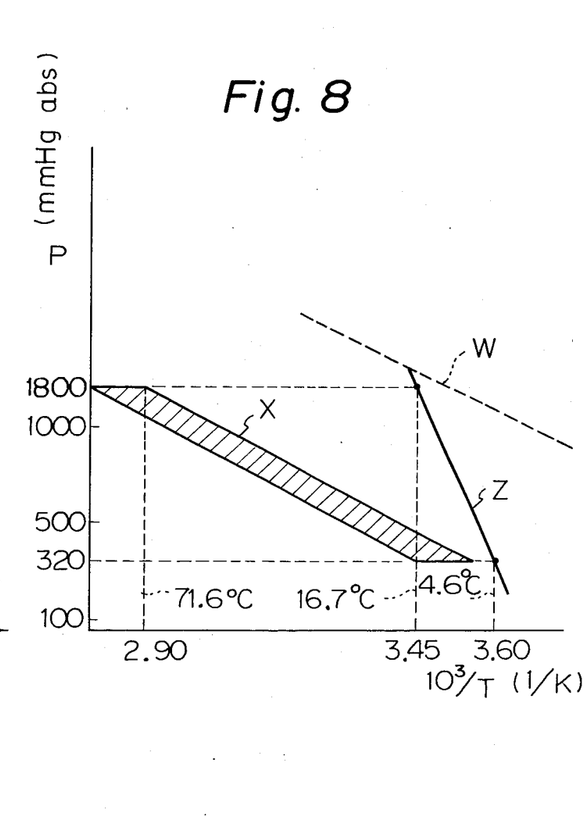
FIG. 8 is a detailed diagram of a process cycle corresponding to FIG. 4 utilized in the first embodiment shown in FIG. 7.

FIG. 8 shows in more detail the graph shown schematically in FIG. 4. In this figure, the hatched portion X represents the range in which the line of the equilibrium of the gas absorption reaction of flon 31 into and from the absorbent tetraethylene glycol dimethyl ether falls. (The equilibrium thereof shifts according to the concentration of the hydrating agent in the absorbent.) The solid line Z represents the equilibrium reaction of gas hydrate formation of flon 31. The dotted line W, on the other hand, represents the relationship between the temperature and the equilibrium pressure in the equilibrium of liquefaction of flon 31.

As described above, the first embodiment of the present invention is of the one-directional circulatory-flow type. That is, the working fluid consisting of the hydrating agent circulates, either in a pure or a combined form, through the four reaction vessels 4 through 7 in a continuous one-directional flow, so that completely continuous operation can be performed.

SECOND EMBODIMENT

A heat pump of the continuous one-directional circulatory-flow type has certain disadvantages. Namely, the solid gas hydrate formed in the fourth vessel 7 should be transferred to the first vessel 4 in the form of a slurry against a pressure difference, with a large amount of pure water accompanying the slurry, which adversely affects the efficiency thereof.

Figure 9:
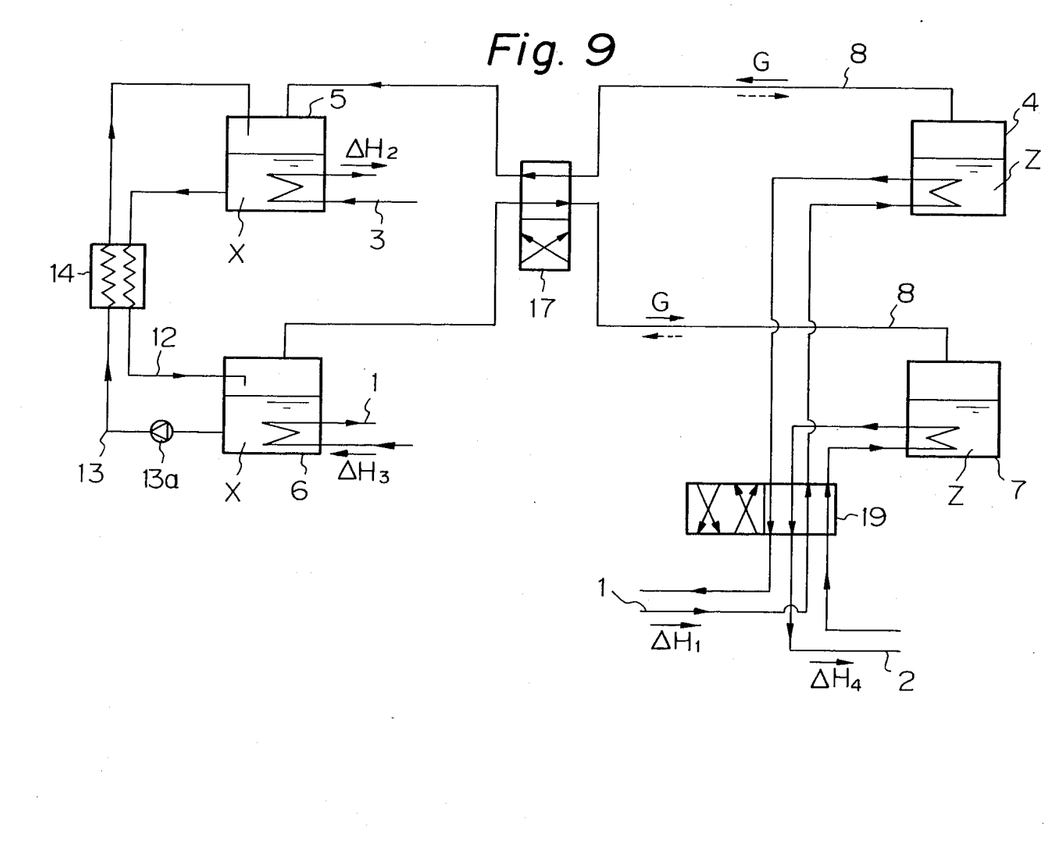
FIG. 9 is a block diagram of second and fourth embodiments of the present invention of the batch process type, utilizing the process cycles shown in FIGS. 4 and 5, respectively.

Thus, FIG. 9 shows a second embodiment of the present invention of the batch process type, which eliminates the need of transferring the solid gas hydrate between the reaction vessels.

The second embodiment shown in FIG. 9 is also for raising the temperature of a thermal medium and uses the process cycle of FIG. 4. The second embodiment is constructed substantially in the same way as the first embodiment, except that the water pipe 9 and the gas hydrate pipe 9 of the first embodiment shown in FIG. 7 are eliminated from this embodiment. In their place, the second embodiment includes a gas pipe switching valve 17 for switching the flow paths of the gas pipes 8 connecting vessels 4 and 7 and vessels 5 and 6, and a heat source switching valve 19 for switching the thermal connections between vessels 4 and 7 and the first and the second heat sources 1 and 2.

The operation of the second embodiment is also substantially the same as that of the first embodiment, except that vessels 4 and 7 alternately serve as a reaction vessel for decomposition and a reaction vessel for formation of the gas hydrate, and it is not necessary to transfer the water and the gas hydrate Z to and from the first and the fourth vessels 4 and 7. Thus, vessels 4 and 7 alternately function as the first and the fourth container means.

More specifically, when valve 17 directs the flow of the hydrating agent G and valve 19 connects the heat sources 1 and 2 to the vessels 4 and 7 as shown in FIG. 9, the gas hydrate Z is decomposed in the first vessel 4, while the formation thereof proceeds in the fourth vessel 7. The flow direction of the hydrating agent in this phase of the process is shown by the solid arrows under reference character G in FIG. 9. As this phase of the process proceeds, the progress of the decomposition of the gas hydrate Z in the first vessel 4 results in a decrease in the amount of the gas hydrate Z and an increase in the amount of water therein. In the fourth vessel 7, on the other hand, an increasing amount of gas hydrate Z is formed, consuming water therein.

At this point, the position of valve 19 is switched, so that the first vessel 4 is thermally connected to the second heat source 2, and the fourth vessel 7 is thermally connected to the first heat source 1. At the same time, the gas pipe switching valve 17 is operated so that the first and the third vessels 4 and 6 and the second and the fourth vessels 5 and 7 are connected to each other, respectively.

Thus, the first and the fourth vessels 4 and 7 interchange functions, the first vessel 4 serving as a reaction vessel for formation and the fourth vessel 7 serving as a reaction vessel for the decomposition of the gas hydrate. Accordingly, the equilibrium states in the first and the fourth vessels 4 and 7 correspond to points D and A on the line Z in FIG. 4, respectively. Thus, the direction of the equilibrium reaction in the two vessels 4 and 7 is reversed with respect to those which proceeded before the switching of valves 17 and 19. The direction of the flow of the hydrating agent G in the gas pipe 8 is shown by dotted arrows under reference character G in FIG. 9.

The switching operations of valves 17 and 19 similar to those described above are effected at appropriate times so that the thermal medium 3 is heated substantially continuously. In FIG. 9, a 4-port 2-position directional control valve and an 8-port 2-position directional control valve are shown as the gas pipe switching valve 17 and the heat source switching valve 19, respectively. They may be replaced, however, by any valve which is capable of controlling the flow directions of the pipes, either automatically or manually.

THIRD EMBODIMENT

Figure 10:
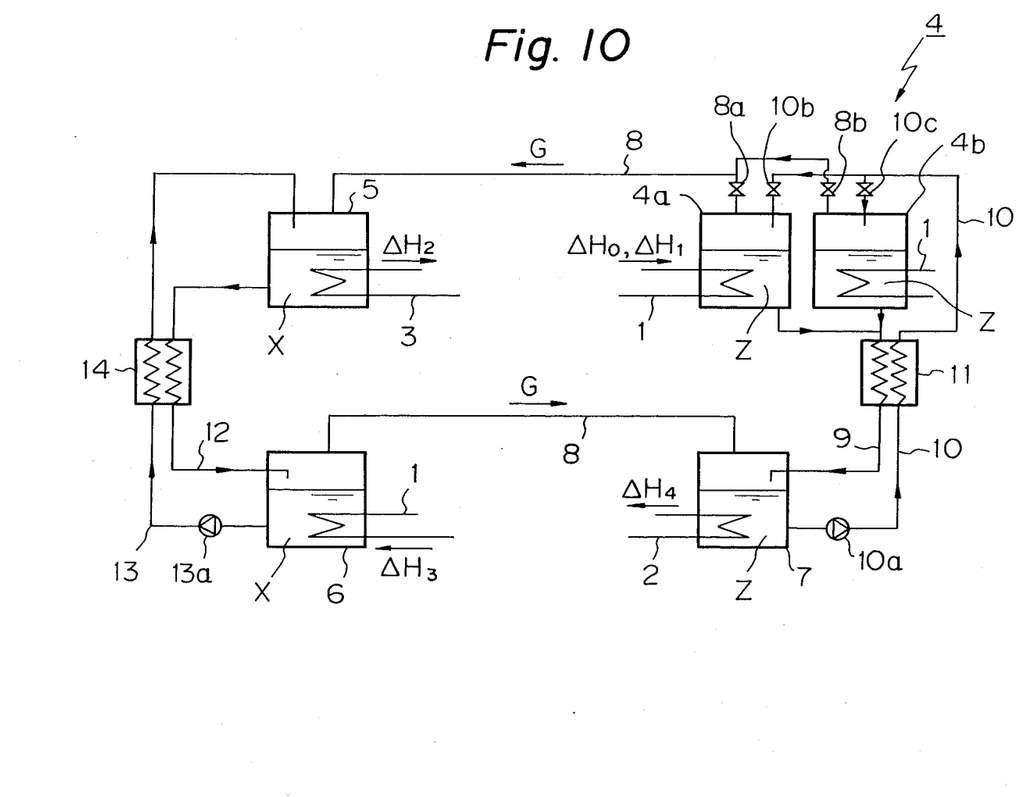
FIG. 10 is a block diagram of a third embodiment of the present invention of the continuous circulatory-flow type, utilizing the process cycle of FIG. 5 for raising the temperature of the thermal medium.

FIG. 10 shows a third embodiment of the present invention utilizing the process cycle of FIG. 5 for raising the temperature of a thermal medium. The third embodiment is of the circulatory continuous-flow type in which the working fluid flows in a continuous one-directional circulatory cycle.

The construction of the third embodiment is substantially the same as that of the first embodiment shown in FIG. 7, except that a first container means 4 comprises two separate vessels 4a and 4b, and that a gas hydrate pipe 10 leading thereto and a gas pipe 8 leading therefrom have valves 10b and 10c and valves 8a and 8b.

Thus, the two separate vessels 4a and 4b of the first container means 4 alternately function as reaction vessels for reactions corresponding to point A0 and to point A1 in FIG. 5. More specifically, when valves 8b and 10b are closed and valves 8a and 10c are open, a gas hydrate Z is continually supplied to vessel 4b from a fourth vessel 7 though the gas hydrate pipe 10, so that the equilibrium in vessel 4b of the first container means 4 corresponds to point A0 in FIG. 5 at which the gas hydrate Z is decomposed into water and liquid phase hydrating agent, absorbing the heat of reaction $\Delta H0$ from the first heat source 1 which thermally contacts vessel 4b. The other vessel 4a of the first container means 4, on the other hand, to which no gas hydrate Z is supplied from the fourth vessel 7 with this setting of the valves, is heated further by the first heat source 1 with which it is in thermal contact, so that the equilibrium therein corresponds to point A1 in FIG. 5. Thus, the liquid phase hydrating agent in vessel 4a is vaporized into the gas phase hydrating agent G, absorbing the heat of vaporization $\Delta H1$ from the first heat source 1.

When the vaporization of the liquid phase hydrating agent in vessel 4a is thus consumed, the hitherto open valves 8a and 10c are closed and hitherto closed valves 8b and 10b are opened, so that the equilibrium in vessel 4a now corresponds to point A0 in FIG. 5 and that in vessel 4b to point A1 of the same figure.

Thus, the hydrating agent G is continually supplied from one of the two separate vessels 4a and 4b of the first container means 4 to a second vessel 5. The structure and the operation of this embodiment are otherwise similar to those of the first embodiment.

Figure 11:
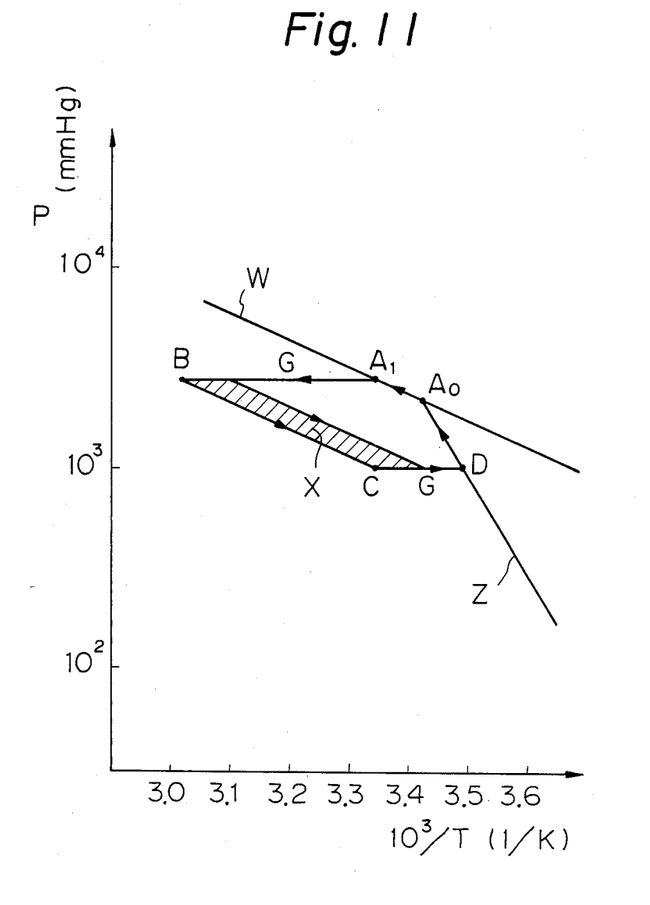
FIG. 11 is a detailed diagram of the process cycle corresonding to FIG. 5 utilized in the third and the fourth embodiments.

FIG. 11 shows in detail the graphs shown schematically in FIG. 5. In the figure, the hatched portion X shows the region within which the line representing the equilibrium of the gas absorption reaction of flon 31 into the absorbent tetraethylene glycol dimethyl ether is shifted depending upon the concentration of the flon in the absorbent. Line Z represents the equilibrium of hydration (gas hydrate formation) of flon 31. Further, line W represents the relationship between the temperature and the equilibrium pressure for equilibrium liquefaction of flon 31.

FOURTH EMBODIMENT

A fourth embodiment of the present invention also makes use of the process cycle shown in FIG. 5 for the purpose of heating the thermal medium. The fourth embodiment, however, is of the batch process type in which the working fluid flows alternately in two opposite directions.

As described above in connection with the second embodiment, the heat pump system of the circulatory-flow type does not have such a high heat efficiency. Furthermore, in the case of the third embodiment, the construction is rather complicated due to the necessity of providing two separate vessels in which the processes corresponding to points A0 and A1 in FIG. 5 alternately proceed. The fourth embodiment is free of these disadvantages of the third embodiment, and therefore is more preferred.

The construction and operation of the fourth embodiment of the present invention are substantially the same as of the second embodiment shown in FIG. 9, except that in the first or the fourth vessel 4 or 7, the equilibrium process corresponding to point A0 in FIG. 5, i.e., the decomposition of the gas hydrate Z into a liquid phase hydrating agent and water, first proceeds after they are thermally connected to the first heat source 1. When vessel 4 or 7 is further heated by absorbing heat from the first heat source 1, the equilibrium corresponding to point A1 in FIG. 5 is reached so that the liquid phase hydrating agent continually vaporizes, absorbing the heat of vaporization $\Delta H1$ from the first heat source 1.

For further details of the construction and the operation of the fourth embodiment, reference is made to the preceding description of the second embodiment.

FIFTH EMBODIMENT

Figure 12:
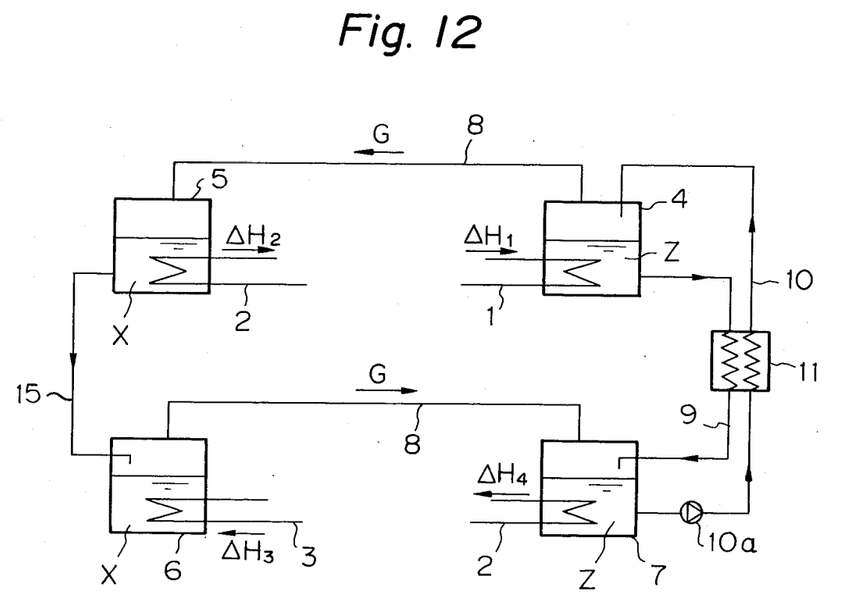
FIG. 12 is a block diagram of a fifth embodiment of the present invention of the continuous circulatory flow type, utilizing the process cycle of FIG. 6 for lowering the temperature of the thermal medium.

FIG. 12 shows a fifth embodiment of the present invention for lowering the temperature of a thermal medium, i.e., for the purpose of refrigeration or cooling, which utilizes the process cycle shown in FIG. 6. The fifth embodiment is of the continuous circulatory-flow type as are the first and the third embodiment.

In the case of this embodiment, line X in FIG. 6 represents the equilibrium of the phase transition between the liquid and the gas phases of the hydrating agent G. Thus, the second and the third vessels 5 and 6 contain liquid phase hydrating agent X, the third vessel 6 being in thermally contact with the thermal medium 3. Thus, the equilibriums in the first through fourth vessels 4 through 7 correspond to points A, B, C, and D on lines X and Z in FIG. 6, respectively. Therefore, the thermal medium 3 is cooled or refrigerated to the target temperature T3. The pipe 15 transports the liquid phase hydrating agent X, which condenses in the second vessel 5, to the third vessel 6. The construction and the operation of the fifth embodiment can be easily understood from the description of the first embodiment.

SIXTH EMBODIMENT

Figure 13:
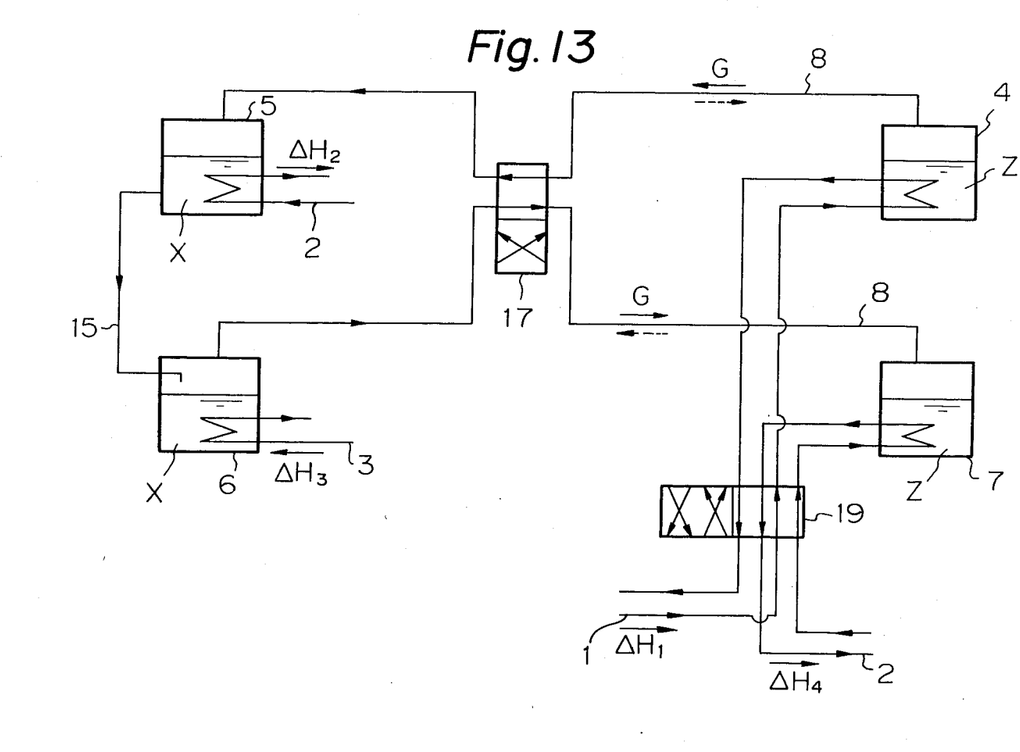
FIG. 13 is a block diagram of a sixth embodiment of the present invention of the batch process type, also utilizing the process cycle of FIG. 6 for lowering the temperature of the thermal medium.

FIG. 13 shows a sixth embodiment of the present invention for lowering the temperature of a thermal medium which also utilizes the process cycle shown in FIG. 6, as does the fifth embodiment. The sixth embodiment, however, is of the batch process type, in which the flow directions of the working fluid between the vessels of reaction are alternated.

When the gas pipe switching valve 17 and the heat source switching valve 19 are in the positions shown in FIG. 13, the states of equilibrium in the first and the second vessels 4 and 7 correspond to points A and D in FIG. 6, the hydrating agent G flowing in the gas pipes 8 in the direction shown by the solid arrows below reference character G. When the positions of the valves 17 and 19 are switched, the functional roles of the vessels 4 and 7 are interchanged, so that the states of equilibrium in the vessels 4 and 7 correspond to points D and A on line Z in FIG. 6. In this situation, the directions of flow of the hydrating agent G in the gas pipes 8 are as shown by the dotted arrows below reference character G in FIG. 13.

The construction and the operation of the sixth embodiment are similar to those of the second embodiment, and can easily be understood from the description thereof given above.

In all of the six embodiments of the present invention described above, the hydrating agent is used as the working fluid, the clathrate formation reaction of which is utilized as one of the two equilibrium reactions of the working fluid of the chemical heat pump. Thus, the amount by which the temperature of the thermal medium is raised or lowered can be made far greater than the temperature difference between the two heat sources.

More specifically, when waste heat at 30 degrees centigrade and open air at 0 degrees centigrade are used as the first and the second heat sources, respectively, in the first embodiment, the thermal medium, i.e., water, can be heated to 70 degrees centigrade, which is extremely high, taking heat losses in actual apparatuses into account. The coefficient of performance in this case is as high as 10, the chemical heat pump in principle needing no external mechanical work. (As the amount of the input energy in the calculation of the coefficient of performance in this case, the energy externally supplied thereto, such as electrical energy necessary for driving the mechanical pumps, is used. The heat of the first heat source, i.e., the waste heat, was not hitherto available for practical purposes, so that it is appropriate to calculate the actual heat efficiency in terms of the ratio of the quantity of obtained heat with regard to the externally supplied energy.) To give one more example, when underground water at 20 degrees centigrade and open air at 0 degrees centigrade are used as the first and the second heat sources, respectively, the water used as the thermal medium can be heated to 50 degrees, which is suitable for room heating purposes, with a coefficient of performance of 10, the definition of the coefficient being the same as above.

What is claimed is:

1. A chemical heat pump for raising a temperature of a thermal medium, comprising:
   a first heat source;
   a second heat source at a temperature lower than a temperature of said first heat source;
   a hydrating agent forming a gas hydrate by clathrate formation reaction with water;
   first container means for containing and placing the gas hydrate of the hydrating agent in thermal contact with the first heat source, thereby decomposing the gas hydrate into water and gas phase hydrating agent, the hydrating agent absorbing a portion of heat of reaction of gas hydrate decomposition;
   first gas conveying means for conveying the gas phase hydrating agent substantially at the pressure at which the gas hydrate is decomposed in said first container means;
   second container means connected to said first gas conveying means, for containing and placing said gas phase hydrating agent conveyed by said first gas conveying means in thermal contact with the thermal medium under an equilibrium reaction substantially at a pressure at which the hydrating agent is conveyed by the first gas conveying means, and at a temperature higher than the temperature of the first heat source, the hydrating agent releasing a heat of reaction of said equilibrium reaction, thereby heating the thermal medium to a temperature higher than the temperature of the first heat source, the heat of reaction of said equilibrium reaction being less than a heat of reaction of clathrate formation reaction of the hydrating agent;
   third container means for containing and placing material formed in said equilibrium reaction in said second container means in thermal contact with said first heat source at a pressure lower than the pressure of the equilibrium reaction, thereby evolving the gas phase hydrating agent;
   second gas conveying means for conveying the hydrating agent evolved in said third container means substantially at a pressure at which the hydrating agent is evolved; and
   fourth container means connected to said second gas conveying means, for containing and placing the hydrating agent in thermal contact with the second heat source substantially at a pressure at which the hydrating agent is conveyed by said second gas conveying means, the hydrating agent being in contact with water and forming the gas hydrate by the clathrate formation reaction.

2. A chemical heat pump as claimed in claim 1, wherein said equilibrium reaction of the hydrating agent in said second container means is a gas absorption and evolvement reaction into and from an absorbent.

3. A chemical heat pump for raising a temperature of a thermal medium, comprising:
   a first heat source;
   a second heat source at a temperature lower than a temperature of said first heat source;
   a hydrating agent forming a gas hydrate by clathrate formation reaction with water;
   first container means for containing and placing the gas hydrate of the hydrating agent in thermal contact with the first heat source, thereby first decomposing the gas hydrate into water and liquid phase hydrating agent and then vaporizing the liquid phase hydrating agent into a gas phase, the hydrating agent absorbing latent heat of vaporization;
   first gas conveying means for conveying the gas phase hydrating agent substantially at a pressure at which the hydrating agent is vaporized in said first container means;
   second container means connected to said first gas conveying means, for containing and placing said gas phase hydrating agent conveyed by said first gas conveying means in contact with an absorbent substantially at a pressure at which the hydrating agent is conveyed by the first gas conveying means and at a temperature higher than the temperature of the first heat source, the absorbent being placed in thermal contact with the thermal medium, the hydrating agent releasing latent heat of liquefaction, thereby heating the thermal medium to a temperature higher than the temperature of the first heat source;
   third container means for containing and placing the hydrating agent absorbed in the absorbent in said second container means in thermal contact with said first heat source at a pressure lower than the pressure in the second container means, thereby evolving the gas phase hydrating agent from the absorbent;
   second gas conveying means for conveying the hydrating agent evolved in said third container means substantially at a pressure at which the hydrating agent is evolved; and
   fourth container means connected to said second gas conveying means, for containing and placing the hydrating agent in thermal contact with the second heat source substantially at a pressure at which the hydrating agent is conveyed by said second gas conveying means, the hydrating agent being in contact with water and forming the gas hydrate by the clathrate formation reaction.

4. A chemical heat pump as claimed in claim 3, wherein said first container means comprises two separate vessels, the chemical heat pump further comprising water conveying means for conveying the water decomposed from the gas hydrate in the first container means from said two separate vessels of the first container means in alternation to said fourth container means, and gas hydrate conveying means for conveying the gas hydrate formed in said fourth container means from said fourth to said first container means.

5. A chemical heat pump for lowering a temperature of a thermal medium, comprising:
a first heat source;
a second heat source at a temperature lower than a temperature of said first heat source;
a hydrating agent forming a gas hydrate by clathrate formation reaction;
first container means for containing and placing the gas hydrate of the hydrating agent in thermal contact with the first heat source, thereby decomposing the gas hydrate into water and gas phase hydrating agent;
first gas conveying means for conveying the gas phase hydrating agent substantially at a pressure at which the gas hydrate is decomposed in said first container means;
second container means connected to said first gas conveying means, for containing and placing said gas phase hydrating agent conveyed by said first gas conveying means in thermal contact with the second heat source, under an equilibrium reaction substantially at a pressure at which the hydrating agent is conveyed by said first gas conveying means;
third container means for containing material formed in said equilibrium reaction in said second container means at a pressure lower than the pressure of the equilibrium reaction in said second container, thereby evolving gas phase hydrating agent from the material, the thermal medium being placed in thermal contact with the material and the hydrating agent absorbing heat of reaction of said equilibrium reaction, thereby lowering the temperature of the thermal medium below the temperature of the second heat source;
second gas conveying means for conveying the hydrating agent evolved in said third container means substantially at a pressure at which the hydrating agent is evolved; and
fourth container means connected to said second gas conveying means, for containing and placing the hydrating agent in thermal contact with the second heat source substantially at a pressure at which the hydrating agent is conveyed by said second gas conveying means, the hydrating agent being in contact with water and forming the gas hydrate by the clathrate formation reaction.

6. A chemical heat pump as claimed in claim 5, wherein said equilibrium reaction of the hydrating agent in said second container means is a gas absorption and evolvement reaction into and from an absorbent.

7. A chemical heat pump as claimed in claim 5, wherein said equilibrium reaction of the hydrating agent in said second container means is a phase transition reaction between a liquid and a gas phase of the hydrating agent.

8. A chemical heat pump as claimed in claim 1, 3, or 5, wherein said hydrating agent which forms a gas hydrate by a clathrate formation reaction is a flon or a mixture of flons.

9. A chemical heat pump as claimed in claim 2, 3, or 6, wherein said absorbent which absorbs and evolves the hydrating agent is selected from the group consisting of N, N-dimethylformamide, dibutyl phthalate, isobutyl acetate, tetraethylene glycol dimethyl ether, and diethylene glycol dimethyl ether.

10. A chemical heat pump as claimed in claim 2, 3, or 6, further comprising:
first absorbent conveying means for conveying the absorbent which has absorbed the hydrating agent in said second container means from said second to said third container means; and
second absorbent conveying means for conveying the absorbent having evolved the hydrating agent in said third container means from said third to said second container means.

11. A chemical heat pump as claimed in claim 7, further comprising liquid phase hydrating agent conveying means for conveying the hydrating agent in liquid phase liquified in said second container means, from said second to said third container means.

12. A chemical heat pump as claimed in claim 10, wherein said first absorbent conveying means comprises a pipe, and said second absorbent conveying means comprises a pipe and a mechanical pump.

13. A chemical heat pump as claimed in claim 11, wherein said liquid phase hydrating agent conveying means comprises a pipe.

14. A chemical heat pump as claimed in claim 1, 3, or 5, further comprising:
water conveying means for conveying the water decomposed from the gas hydrate in said first container means, from said first to said fourth container means; and
gas hydrate conveying means for conveying the gas hydrate formed in said fourth container means, from said fourth to said first container means.

15. A chemical heat pump as claimed in claim 14, wherein said water conveying means comprises a pipe, and said gas hydrate conveying means comprises a pipe and a mechanical pump.

16. A chemical heat pump as claimed in claim 14, further comprising heat exchanger means for carrying out heat exchange between said water conveying means and gas hydrate conveying means.

17. A chemical heat pump as claimed in claim 10, further comprising heat exchanger means for carrying out heat exchange between said first and second absorbent conveying means.

18. A chemical heat pump as claimed in claim 1, 3, or 5, further comprising:
gas flow path switching means for switching flow paths of the gas phase hydrating agent in said first and second gas conveying means; and
heat source switching means for switching thermal contacts of said first and second heat source with said first and fourth container means.

19. A chemical heat pump as claimed in claim 1, 3, or 5, wherein said first heat source comprises waste heat.

20. A chemical heat pump as claimed in claim 1, 3, or 5, wherein said first heat source comprises underground water.

21. A chemical heat pump as claimed in claim 1, 3, or 5, wherein said second heat source comprises coolant water.

22. A chemical heat pump as claimed in claim 1, 3, or 5, wherein said second heat source comprises open air.

* * * * *